(12) United States Patent
Wen et al.

(10) Patent No.: US 11,846,999 B2
(45) Date of Patent: Dec. 19, 2023

(54) PORTABLE ELECTRONIC DEVICE

(71) Applicant: Acer Incorporated, New Taipei (TW)

(72) Inventors: Chun-Hung Wen, New Taipei (TW);
Chun-Hsien Chen, New Taipei (TW);
Hui-Ping Sun, New Taipei (TW);
Yen-Chou Chueh, New Taipei (TW)

(73) Assignee: Acer Incorporated, New Taipei (TW)

( * ) Notice: Subject to any disclaimer, the term of this patent is extended or adjusted under 35 U.S.C. 154(b) by 152 days.

(21) Appl. No.: 17/571,548

(22) Filed: Jan. 10, 2022

(65) Prior Publication Data
US 2022/0382339 A1    Dec. 1, 2022

(30) Foreign Application Priority Data

Jun. 1, 2021 (TW) ................................. 110119905

(51) Int. Cl.
*G06F 1/16* (2006.01)
(52) U.S. Cl.
CPC .......... *G06F 1/1681* (2013.01); *G06F 1/1616* (2013.01)
(58) Field of Classification Search
CPC combination set(s) only.
See application file for complete search history.

(56) References Cited

U.S. PATENT DOCUMENTS

| | | | | |
|---|---|---|---|---|
| 9,201,466 B2 * | 12/2015 | Lai | ........................ | G06F 1/1681 |
| 10,558,244 B1 * | 2/2020 | Brocklesby | ........... | G06F 1/1616 |
| 10,585,451 B1 * | 3/2020 | Brocklesby | ........... | G06F 1/1616 |
| 10,606,319 B1 * | 3/2020 | Brocklesby | ........... | G06F 1/1681 |
| 10,635,132 B1 * | 4/2020 | Brocklesby | ........... | G06F 1/1681 |
| 10,860,068 B2 * | 12/2020 | Brocklesby | ............. | G06F 1/166 |
| 2014/0043749 A1 * | 2/2014 | Lai | ........................ | G06F 1/1681 |
| | | | | 361/679.27 |

* cited by examiner

*Primary Examiner* — Lisa Lea-Edmonds
(74) *Attorney, Agent, or Firm* — JCIPRNET (57) ABSTRACT

A portable electronic device including a first body, a second body and a supporting mechanism is provided. The first body has a bottom surface and an opening located at the bottom surface. The second body is pivoted to the first body and has a rear surface and a magnetic part located at the rear surface. The supporting mechanism is disposed in the first body corresponding to the opening. The rear surface of the second body is rotated toward the bottom surface of the first body to allow the supporting mechanism to be magnetically attracted to the magnetic part. Afterwards, the rear surface of the second body is rotated away from the bottom surface of the first body, and the supporting mechanism is driven by the second body to move out of the first body via the opening. When the supporting mechanism is locked, a support shaft supports the second body.

13 Claims, 11 Drawing Sheets

PORTABLE ELECTRONIC DEVICE

CROSS-REFERENCE TO RELATED APPLICATION

This application claims the priority benefit of Taiwan application serial no. 110119905, filed on Jun. 1, 2021. The entirety of the above-mentioned patent application is hereby incorporated by reference herein and made a part of this specification.

BACKGROUND

Technical Field

The disclosure relates to an electronic device, and in particular to a portable electronic device.

Description of Related Art

A laptop is formed by a first body and a second body. The first body has the ability to perform logical operations and data access, and the second body has the ability to display images. Through a relative rotation of the first body and the second body, a user may adjust the spread angle of the second body relative to the first body according to personal needs. Take a 360-degree flip laptop as an example. When the spread angle of the second body relative to the first body is greater than or equal to 270 degrees, the first body may be placed flat on the desktop, and the second body may be placed vertically on the desktop for the user to view or operate the second body. Since the second body is unsupported, when the user's finger or stylus touches the second body, the second body shakes or even tilts, causing inconvenience and difficulties in operation for the user.

SUMMARY

The disclosure provides a portable electronic device which provides convenience and stability in operation.

The disclosure proposes a portable electronic device including a first body, a second body, and a supporting mechanism. The first body has a bottom surface and an opening located at the bottom surface. The second body is pivoted to the first body and has a rear surface and a magnetic part located at the rear surface. The supporting mechanism is disposed in the first body corresponding to the opening. The supporting mechanism includes a support shaft, a magnetic element, and a positioning stand. The support shaft has a first end part and a second end part opposite to the first end part. The positioning stand has a slide rail and multiple positioning protrusions. The positioning protrusions are arranged at intervals in the slide rail. The first end part is slidably disposed in the slide rail. The magnetic element is pivoted to the second end part. The rear surface of the second body is rotated toward the bottom surface of the first body to allow the magnetic element to be magnetically attracted to the magnetic part. Next, the rear surface of the second body is rotated away from the bottom surface of the first body. The magnetic element and the support shaft are driven by the second body to move out from the first body via the opening. When the first end part of the support shaft that slides in the slide rail is engaged with any one of the positioning protrusions, the support shaft supports the second body.

Based on the above, in the portable electronic device of the disclosure, the supporting mechanism is disposed in the first body and be lifted and lowered. A user rotates the second body along the first rotating direction until a magnetic attraction is generated between the second body and the supporting mechanism and the supporting mechanism is attracted to the second body. Next, the second body is rotated along the second rotating direction opposite to the first rotating direction, so that the supporting mechanism is lifted as the second body moves. Once the second body stops being rotated along the second rotating direction and the supporting mechanism is locked, the supporting mechanism supports the second body to prevent the second body from shaking or tilting when being touched by a finger or a stylus, thereby improving convenience and stability in operation.

To further describe the above features and advantages of the disclosure, embodiments accompanied with drawings are described below in details.

DESCRIPTION OF THE EMBODIMENTS

Figure 1:
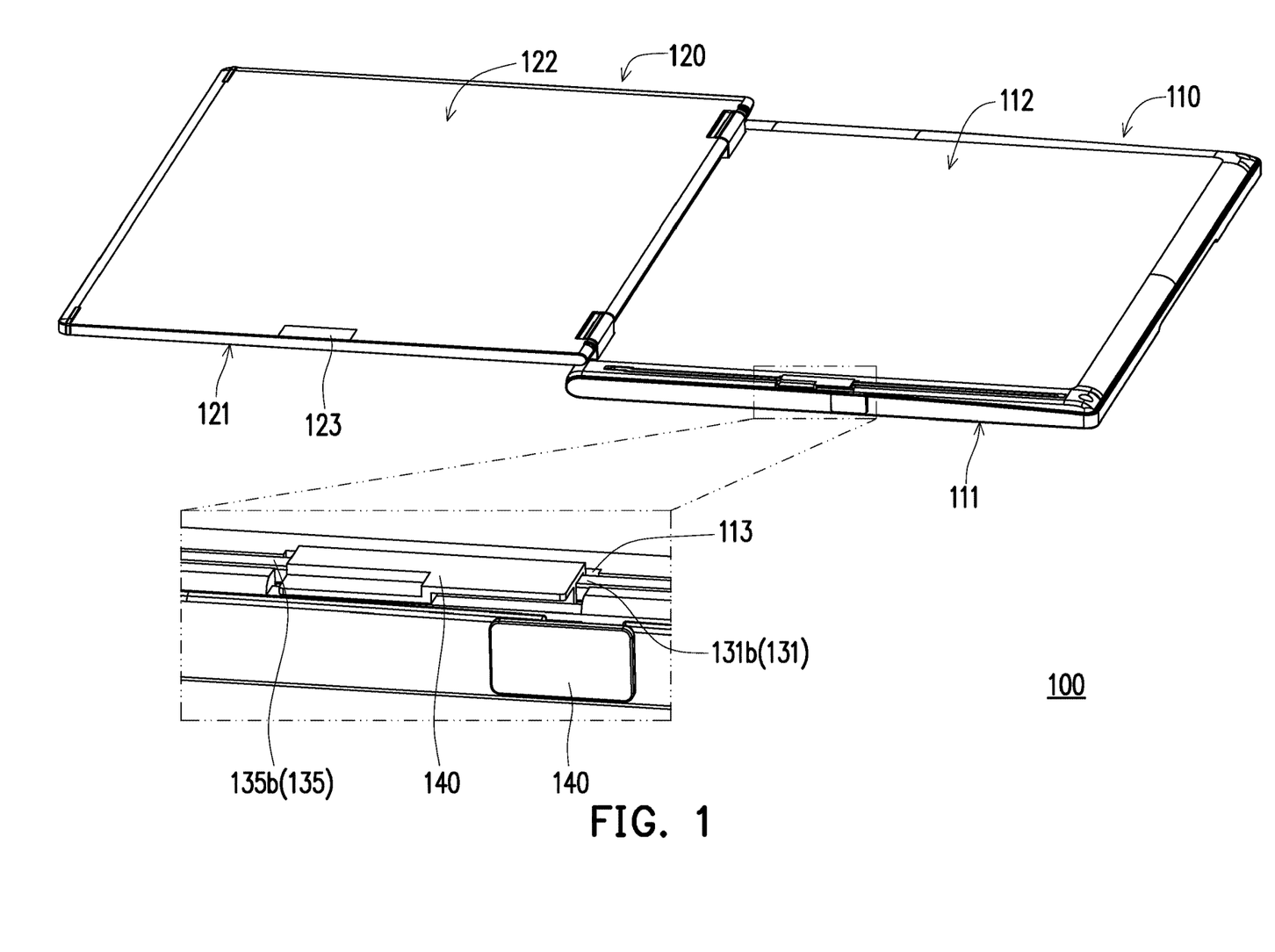
FIG. 1 is a schematic view of a portable electronic device according to an embodiment of the disclosure.
Figure 2:
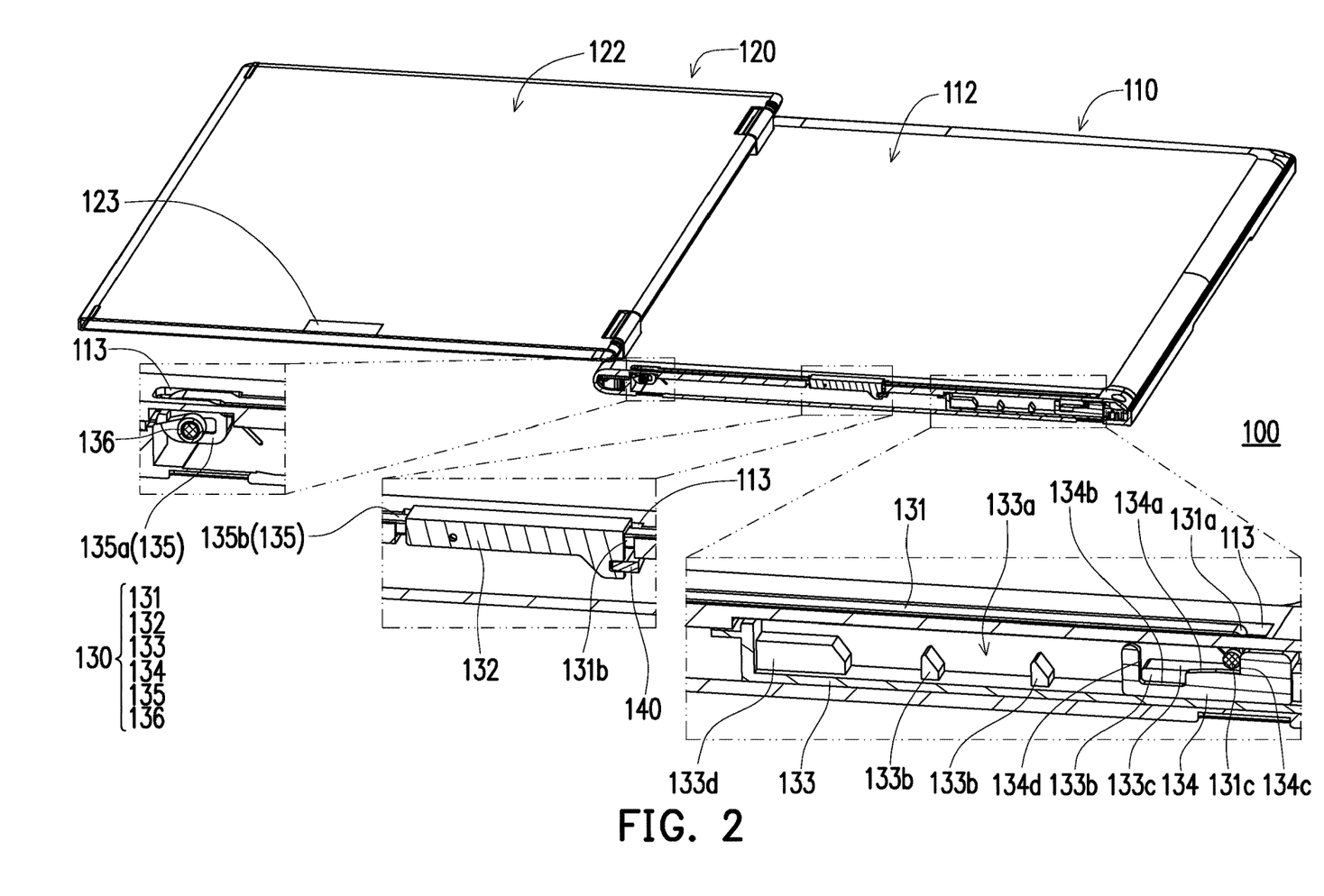
FIG. 2 is a schematic cross-sectional view of the portable electronic device of FIG. 1.

FIG. 1 is a schematic view of a portable electronic device according to an embodiment of the disclosure. FIG. 2 is a schematic cross-sectional view of the portable electronic device of FIG. 1. Referring to FIGS. 1 and 2, in this embodiment, a portable electronic device 100 may be a laptop, a dual-screen laptop or other foldable electronic devices, and may be rotated 360 degrees. Taking a laptop as an example, the portable electronic device 100 includes a first body 110 and a second body 120 pivoted to the first body 110, the first body 110 has the ability to perform logic operations and data access, and the second body 120 has the ability to display images. In addition, the second body 120 may be rotated 360 degrees relative to the first body 110. Under the status shown in FIGS. 1 and 2, the spread angle of the second body 120 relative to the first body 110 is roughly equal to 180 degrees.

The first body 110 has an operation surface 111 (that is, the surface where the keyboard is located), a bottom surface 112 opposite to the operation surface 111, and an opening 113 located at the bottom surface 112, and the opening 113 serves as a communication path between the external space and the internal space of the first body 110. On the other hand, the second body 120 has a display surface 121, a rear surface 122 opposite to the display surface 121, and a magnetic part 123 located at the rear surface 122, and the opening 113 roughly falls on the remote end of the rotation path of the magnetic part 123.

Figure 3:
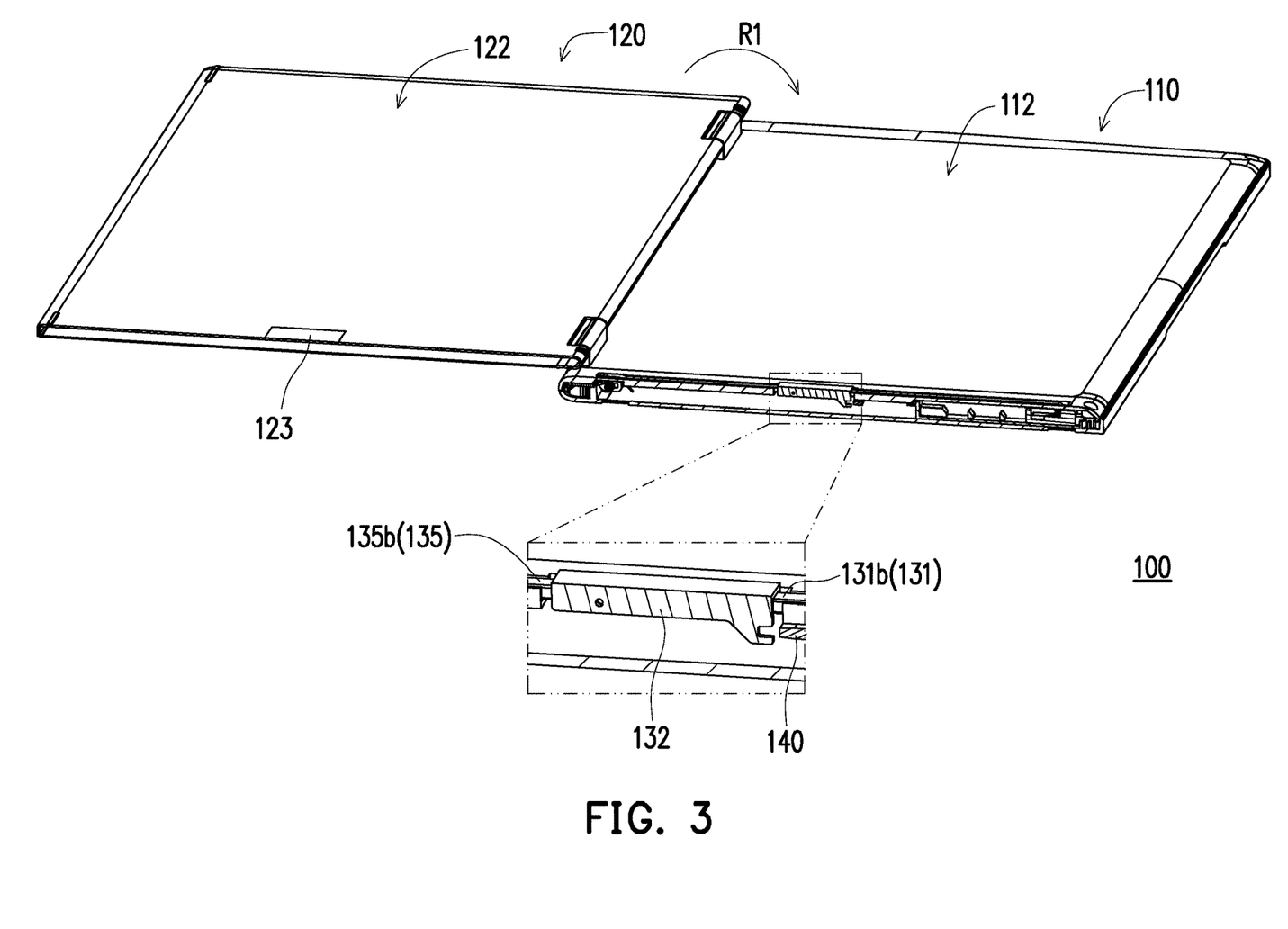
FIG. 3 is a schematic cross-sectional view of a switch knob of FIG. 2 after the switch knob is unlocked.
Figure 4:
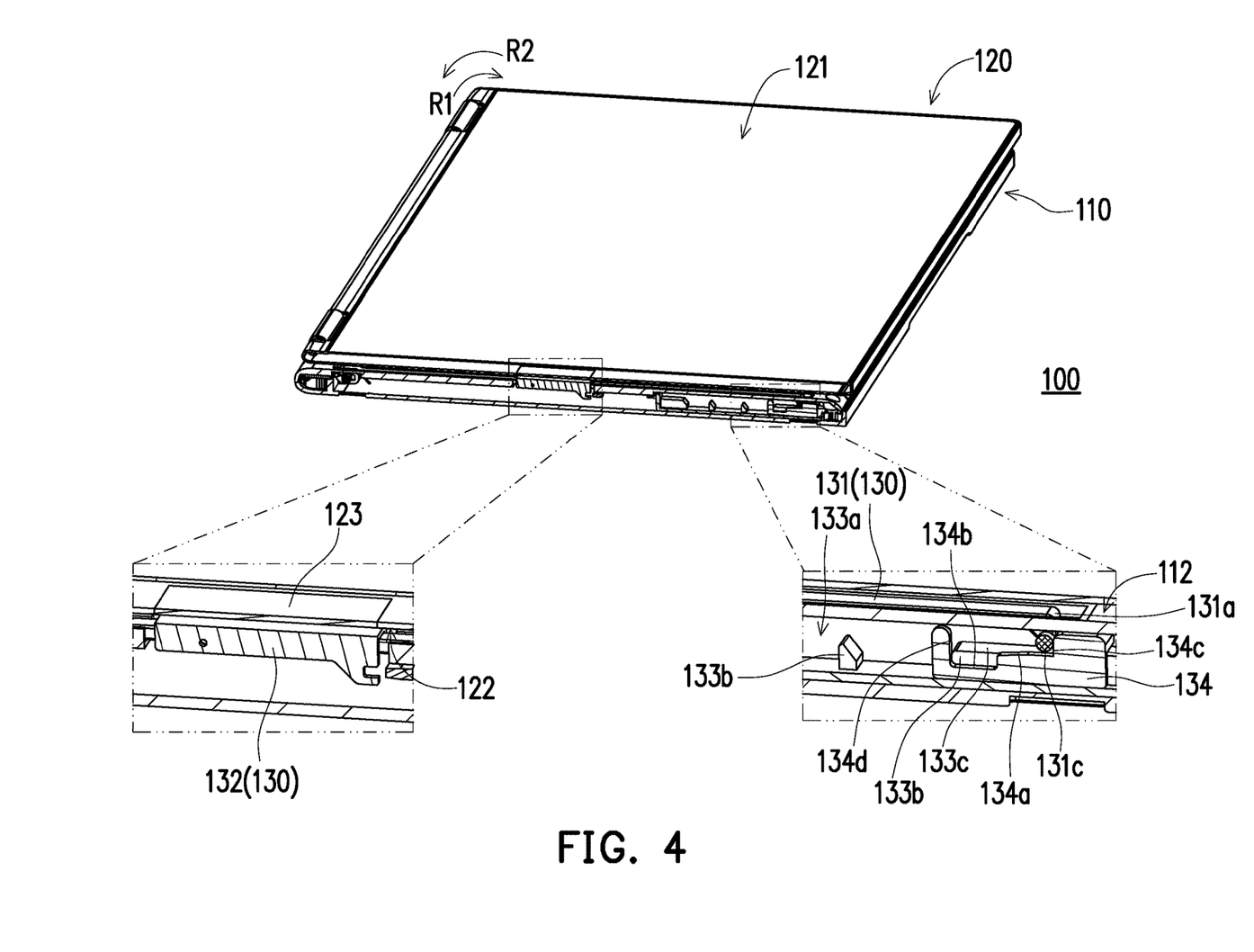
FIG. 4 is a schematic cross-sectional view of a second body in FIG. 3 after the second body is rotated 360 degrees.
Figure 5:
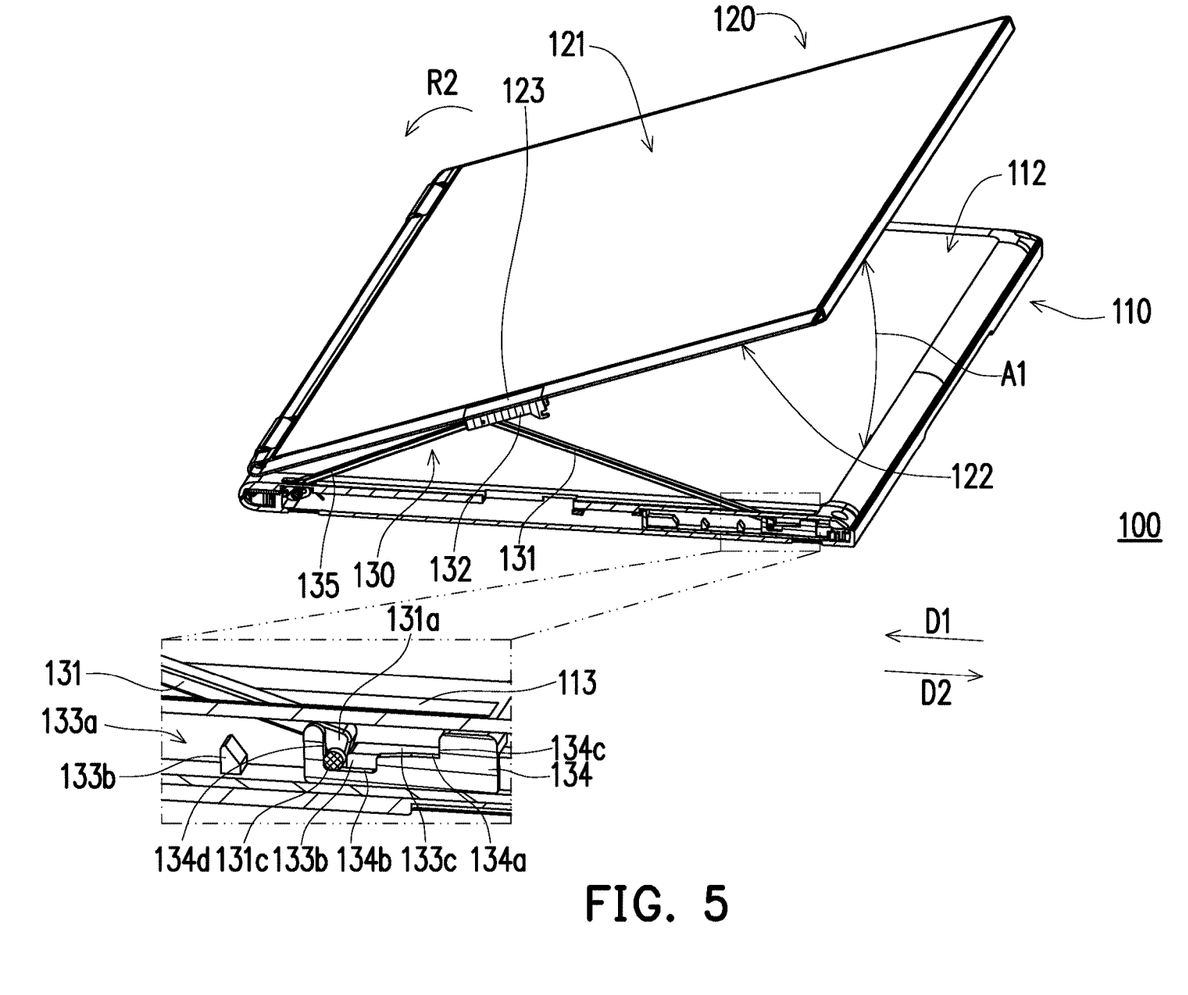
FIG. 5 is a schematic cross-sectional view of a supporting mechanism of FIG. 4 lifting and supporting the second body.

FIG. 3 is a schematic cross-sectional view of a switch knob of FIG. 2 after the switch knob is unlocked. FIG. 4 is a schematic cross-sectional view of a second body in FIG. 3 after the second body is rotated 360 degrees. FIG. 5 is a schematic cross-sectional view of a supporting mechanism of FIG. 4 lifting and supporting the second body. Referring to FIGS. 2 to 4, the portable electronic device 100 further includes a supporting mechanism 130 and a switch knob 140, and the supporting mechanism 130 is disposed in the first body 110 corresponding to the opening 113, and is adapted for moving out of the first body 110 or back into the first body 110 via the opening 113.

Specifically, the switch knob 140 is slidably disposed on a side of the first body 110 corresponding to the supporting mechanism 130. Under the status shown in FIG. 2, the switch knob 140 is engaged with the supporting mechanism 130 to lock the supporting mechanism 130, so that the supporting mechanism 130 may not be lifted. Under the status shown in FIG. 3, the switch knob 140 is detached from the supporting mechanism 130 to unlock the supporting mechanism 130, so that the supporting mechanism 130 may be driven by the second body 120 to be lifted. As shown in FIGS. 4 and 5, once the second body 120 stops being rotated and the supporting mechanism 130 is locked, the supporting mechanism 130 supports the second body 120 so that a user may view or operate the display surface 121 of the second body 120.

As shown in FIG. 5, the display surface 121 of the second body 120 may be a touch display surface. Since the second body 120 is supported by the supporting mechanism 130, when the user's finger or stylus touches the display surface 121, the second body 120 is unlikely to shake or tilt, thereby having good operating convenience and stability. As shown in FIG. 2, the supporting mechanism 130 is integrated with a multi-stage positioning design. In the process of lifting the supporting mechanism 130, the supporting mechanism 130 may be selectively locked to a first positioning point, a second positioning point or other positioning points to flexibly adjust the viewing or operating angle of the second body 120.

The lifting mechanism of the supporting mechanism 130 is explained as follows. Referring to FIGS. 3 and 4, the second body 120 is first rotated along a first rotating direction R1, so that the rear surface 122 of the second body 120 is rotated toward the bottom surface 112 of the first body 110. When the rear surface 122 of the second body 120 is close to the bottom surface 112 of the first body 110, the spread angle of the second body 120 relative to the first body 110 is roughly equal to 360 degrees, the magnetic part 123 is close to the supporting mechanism 130, and the supporting mechanism 130 is magnetically attracted to the second body 120 through the magnetic attraction of the magnetic part 123.

Next, referring to FIGS. 4 and 5, the second body 120 is rotated along a second rotating direction R2 opposite to the first rotating direction R1, so that the rear surface 122 of the second body 120 is rotated away from the bottom surface 112 of the first body 110. At the same time, the supporting mechanism 130 is driven by the second body 120 to move out of the first body 110 via the opening 113; that is, the supporting mechanism 130 is driven by the second body 120 to be lifted. For example, once the second body 120 stops being rotated and the supporting mechanism 130 is locked at the first positioning point, the supporting mechanism 130 supports the second body 120.

Figure 6:
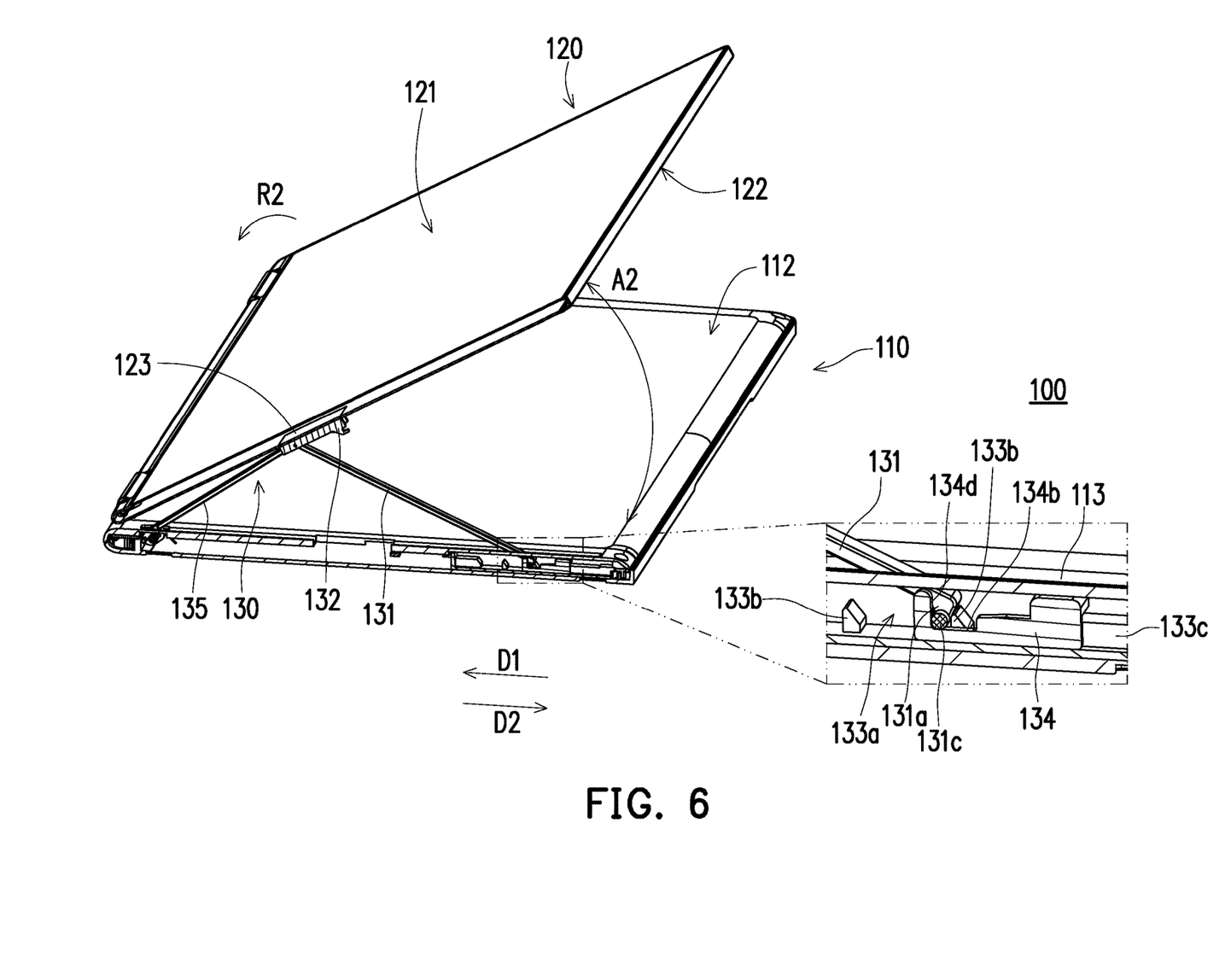
FIGS. 6 and 7 are schematic cross-sectional views of the supporting mechanism of FIG. 5 continuously being lifted and supporting the second body.
Figure 7:
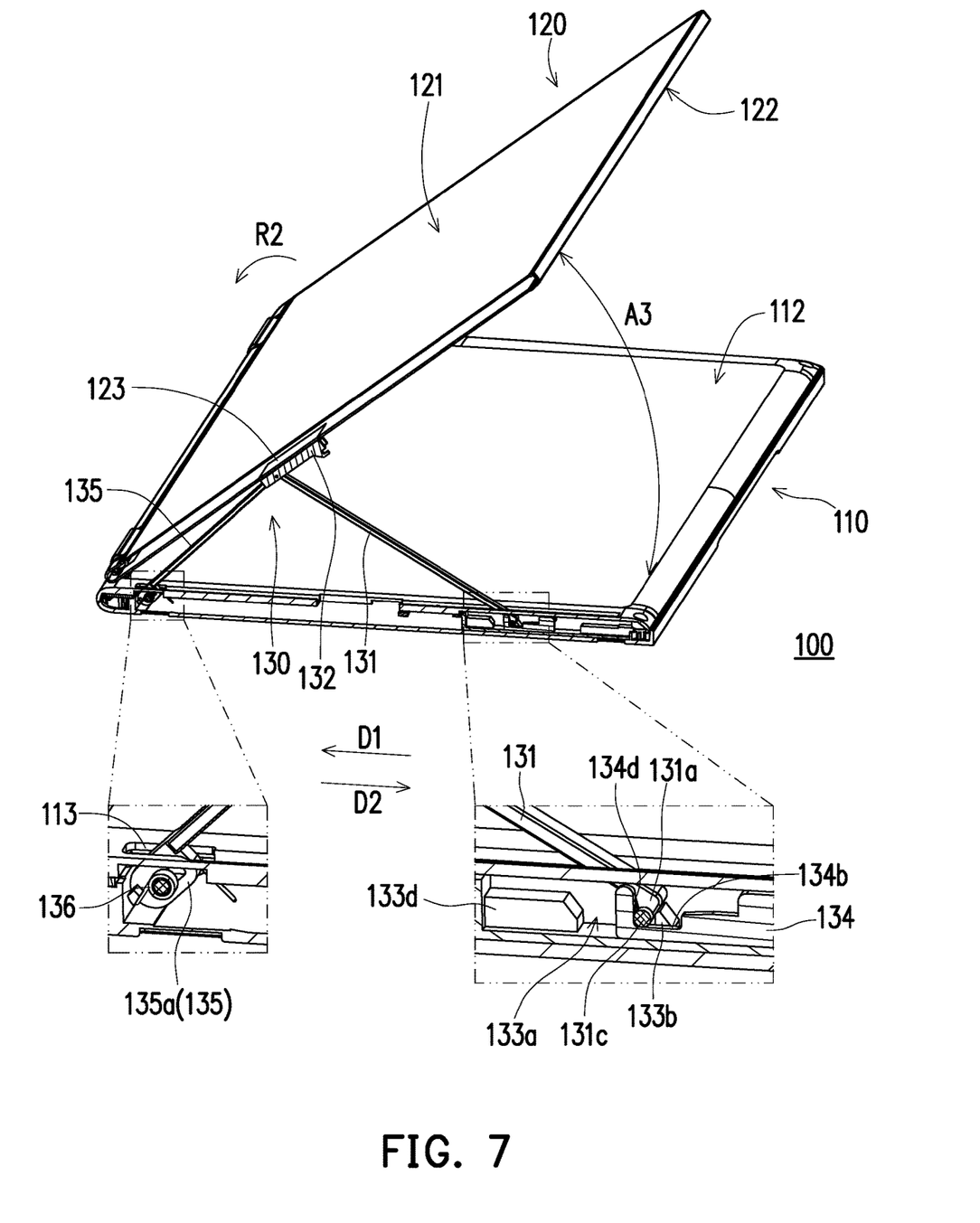

FIGS. 6 and 7 are schematic cross-sectional views of the supporting mechanism of FIG. 5 continuously being lifted and supporting the second body. Referring to FIGS. 5 to 7, the user may continue to rotate the second body 120 along the second rotating direction R2 to unlock the supporting mechanism 130 (that is, to move the supporting mechanism 130 away from the first positioning point), and continue to lift the supporting mechanism 130. Once the second body 120 stops being rotated and the supporting mechanism 130 is locked at the second positioning point or other positioning points, the supporting mechanism 130 supports the second body 120 to flexibly adjust the viewing angle or operating angle of the second body 120.

In other words, the user only needs to rotate the second body 120 to bring the rear surface 122 thereof close to the bottom surface 112 of the first body 110, and then rotate the rear surface 122 of the second body 120 away from the bottom surface 112 of the first body 110 to allow the second body 120 to drive the supporting mechanism 130 to be lifted. The operation is simple and intuitive.

Referring to FIGS. 2 and 3, in this embodiment, the supporting mechanism 130 includes a support shaft 131, a magnetic element 132, and a positioning stand 133. The support shaft 131 has a first end part 131a and a second end part 131b opposite to the first end part 131a, and the magnetic element 132 is pivoted to the second end part 131b. On the other hand, the support shaft 131 and the magnetic element 132 may be lifted and lowered at the same time, and the positioning stand 133 is fixed in the first body 110. For example, the magnetic element 132 has a slot disposed corresponding to the switch knob 140, and the switch knob 140 has a latch corresponding to the slot. Under the status shown in FIG. 2, the latch of the switch knob 140 is engaged with the slot of the magnetic element 132 to lock the supporting mechanism 130, so that the supporting mechanism 130 may not be lifted. Under the status shown in FIG. 3, the latch of the switch knob 140 is moved away from the slot of the magnetic element 132 to unlock the supporting mechanism 130, so that the supporting mechanism 130 may be driven by the second body 120 to be lifted.

As shown in FIG. 2, the positioning stand 133 has a slide rail 133a and a plurality of positioning protrusions 133b. The slide rail 133a is aligned with the opening 113, and the positioning protrusions 133b are arranged in the slide rail 133a at intervals. As shown in FIGS. 4 to 7, the first end part 131a of the support shaft 131 is slidably disposed in the slide rail 133a to slide through any positioning protrusion 133b or be engaged with any positioning protrusion 133b.

As shown in FIGS. 4 to 7, in the process of lifting the support shaft 131 and the magnetic element 132 at the same time, the first end part 131a of the support shaft 131 slides in the slide rail 133a and slides between the positioning protrusions 133b. Specifically, the positioning protrusions 133b are used to provide multi-stage positioning to the support shaft 131 to lock the lifting height or lifting angle of the support shaft 131. Specifically, when the first end part 131a of the support shaft 131 is engaged with any positioning protrusion 133b, the lifting height or lifting angle of the support shaft 131 is locked, so that the support shaft 131 stably supports the second body 120.

In the process of lifting the support shaft 131, the first end part 131a of the support shaft 131 slides in the slide rail 133a along a first direction D1. When the first end part 131a of the support shaft 131 slides along the first direction D1 toward a first positioning protrusion 133b and is engaged with the first positioning protrusion 133b, the included angle between the rear surface 122 of the second body 120 and the bottom surface 112 of the first body 110 is A1, as shown in FIG. 5. When the first end part 131a of the support shaft 131 slides along the first direction D1 from the first positioning protrusion 133b to a second positioning protrusion 133b and is engaged with the second positioning protrusion 133b, the included angle between the rear surface 122 of the second body 120 and the bottom surface 112 of the first body 110 is increased to A2, as shown in FIG. 6. When the first end part 131a of the support shaft 131 slides along the first direction D1 from the second positioning protrusion 133b to a third positioning protrusion 133b and is engaged with the third positioning protrusion 133b, the included angle between the rear surface 122 of the second body 120 and the bottom surface 112 of the first body 110 is increased to A3, as shown in FIG. 7.

In other words, when the first end part 131a of the support shaft 131 is engaged with any positioning protrusion 133b, the positioning protrusion 133b structurally interferes with the first end part 131a of the support shaft 131 and prevents the first end part 131a of the support shaft 131 from sliding along a second direction D2 which is opposite to the first direction D1, so as to lock the lifting height or lifting angle of the support shaft 131.

Referring to FIGS. 4 to 7, in the process of the first end part 131a of the support shaft 131 sliding along the first direction D1 in the slide rail 133a, the lifting height or lifting angle of the support shaft 131 continues to increase, and the included angle between the rear surface 122 of the second body 120 and the bottom surface 112 of the first body 110 continues to increase. In contrast, the first end part 131a of the support shaft 131 may selectively slide along the second direction D2 in the slide rail 133a to reduce the lifting height or lifting angle of the support shaft 131 (that is, the support shaft 131 is lowered) and reduce the included angle between the rear surface 122 of the second body 120 and the bottom surface 112 of the first body 110.

Referring to FIGS. 2, 4, and 5, in this embodiment, the supporting mechanism 130 further includes a slider 134. The slider 134 is slidably arranged in the slide rail 133a of the positioning stand 133, and slides along the first direction D1 or the second direction D2 with the first end part 131a of the support shaft 131. Specifically, the support shaft 131 further has a projection 131c connected to the first end part 131a, and the projection 131c is slidably connected to the slider 134. More specifically, the slider 134 has a first positioning recess 134a and a second positioning recess 134b connected to the first positioning recess 134a, and the projection 131c slides in the first positioning recess 134a and the second positioning recess 134b.

Referring to FIGS. 4 to 7, in the process of the first end part 131a of the support shaft 131 sliding along the first direction D1 in the slide rail 133a, the projection 131c slides from the first positioning recess 134a to the second positioning recess 134b, and drives the slider 134 to slide along the first direction D1 in the slide rail 133a. When the lifting height or lifting angle of the support shaft 131 is locked, the first end part 131a of the support shaft 131 is engaged with any positioning protrusion 133b and is located in the second positioning recess 134b.

Referring to FIGS. 2, 4, and 5, the bottom of the first positioning recess 134a and the top of any positioning protrusion 133b are higher than the bottom of the second positioning recess 134b, and the bottom of the first positioning recess 134a is higher or as high as the top of any positioning protrusion 133b. When the projection 131c of the support shaft 131 is located in the first positioning recess 134a, the first end part 131a of the support shaft 131 is detached from any positioning protrusion 133b to prevent the first end part 131a of the support shaft 131 from being blocked by the top of any positioning protrusion 133b and unable to slide.

In this embodiment, the slider 134 further has a first positioning surface 134c and a second positioning surface 134d opposite to the first positioning surface 134c. The first positioning surface 134c is connected to the bottom of the first positioning recess 134a, and the second positioning surface 134d is connected to the bottom of the second positioning recess 134b. That is, the first positioning recess 134a and the second positioning recess 134b are located between the first positioning surface 134c and the second positioning surface 134d.

Specifically, the positioning stand 133 further has a first guide boss 133c and a second guide boss 133d located in the slide rail 133a, and the positioning protrusions 133b are arranged at intervals between the first guide boss 133c and the second guide boss 133d. In addition, one of the positioning protrusions 133b is connected to the first guide boss 133c, or one of the positioning protrusions 133b is integrally formed on a side of the first guide boss 133c facing the second guide boss 133d.

Referring to FIGS. 2 and 4, the extension length of the slide rail 133a roughly determines the sliding route of the first end part 131a of the support shaft 131. The first guide boss 133c roughly falls on a right dead center position of the sliding route, and the second guide boss 133d roughly falls on a left dead center position of the sliding route. When the first end part 131a of the support shaft 131 is at the right dead center position of the sliding route, the projection 131c is located in the first positioning recess 134a of the slider 134, and the first end part 131a is located on the first guide boss 133c.

As shown in FIGS. 4 and 5, the second body 120 is rotated along the second rotating direction R2 and drives the support shaft 131 through the magnetic element 132, so that the first end part 131a of the support shaft 131 slides along the first direction D1 on the first guide boss 133c, and the projection 131c slides from the first positioning recess 134a into the second positioning recess 134b. Since the first end part 131a is supported by the first guide boss 133c, the projection 131c slid into the second positioning recess 134b may not be lowered to the bottom of the second positioning recess 134b for the time being. Next, the first end part 131a of the support shaft 131 continues to slide along the first direction D1, so that the projection 131c of the support shaft 131 contacts the second positioning surface 134d and drives the slider 134 to slide along the first direction D1. When the first end part 131a of the support shaft 131 is detached from the first guide boss 133c, the projection 131c is lowered to the bottom of the second positioning recess 134b. Once the support shaft 131 stops sliding, the first end part 131a is engaged with the first positioning protrusion 133b.

As shown in FIGS. 5 and 6, the second body 120 continues to be rotated along the second rotating direction R2 and drives the support shaft 131 through the magnetic element 132, so that the first end part 131a of the support shaft 131 continues to slide along the first direction D1. The first end part 131a is detached from the first positioning protrusion 133b and slides toward the second positioning protrusion 133b. At the same time, the projection 131c drives the slider 134 to slide toward the second positioning protrusion 133b. When the first end part 131a of the support shaft 131 contacts the second positioning protrusion 133b, the first end part 131a and the projection 131c of the support shaft 131 are lifted upwards and slide through the second positioning protrusion 133b. After the first end part 131a and the projection 131c of the support shaft 131 slide through the second positioning protrusion 133b, the first end part 131a and projection 131c are lowered at the same time. Once the support shaft 131 stops sliding, the first end part 131a is engaged with the second positioning protrusion 133b, and the projection 131c is lowered to the bottom of the second positioning recess 134b.

As shown in FIGS. 6 and 7, the second body 120 continues to be rotated along the second rotating direction R2 and drives the support shaft 131 through the magnetic element 132, so that the first end part 131a of the support shaft 131 continues to slide along the first direction D1. The first end part 131a is detached from the second positioning protrusion 133b and slides toward the third positioning protrusion 133b. At the same time, the projection 131c drives the slider 134 to slide toward the third positioning protrusion 133b. When the first end part 131a of the support shaft 131 contacts the third positioning protrusion 133b, the first end part 131a and the projection 131c of the support shaft 131 are lifted upwards and slide through the third positioning protrusion 133b. After the first end part 131a and the projection 131c of the support shaft 131 slide through the third positioning protrusion 133b, the first end part 131a and the projection 131c are lowered at the same time. Once the support shaft 131 stops sliding, the first end part 131a is engaged with the third positioning protrusion 133b, and the projection 131c is lowered to the bottom of the second positioning recess 134b.

Figure 8:
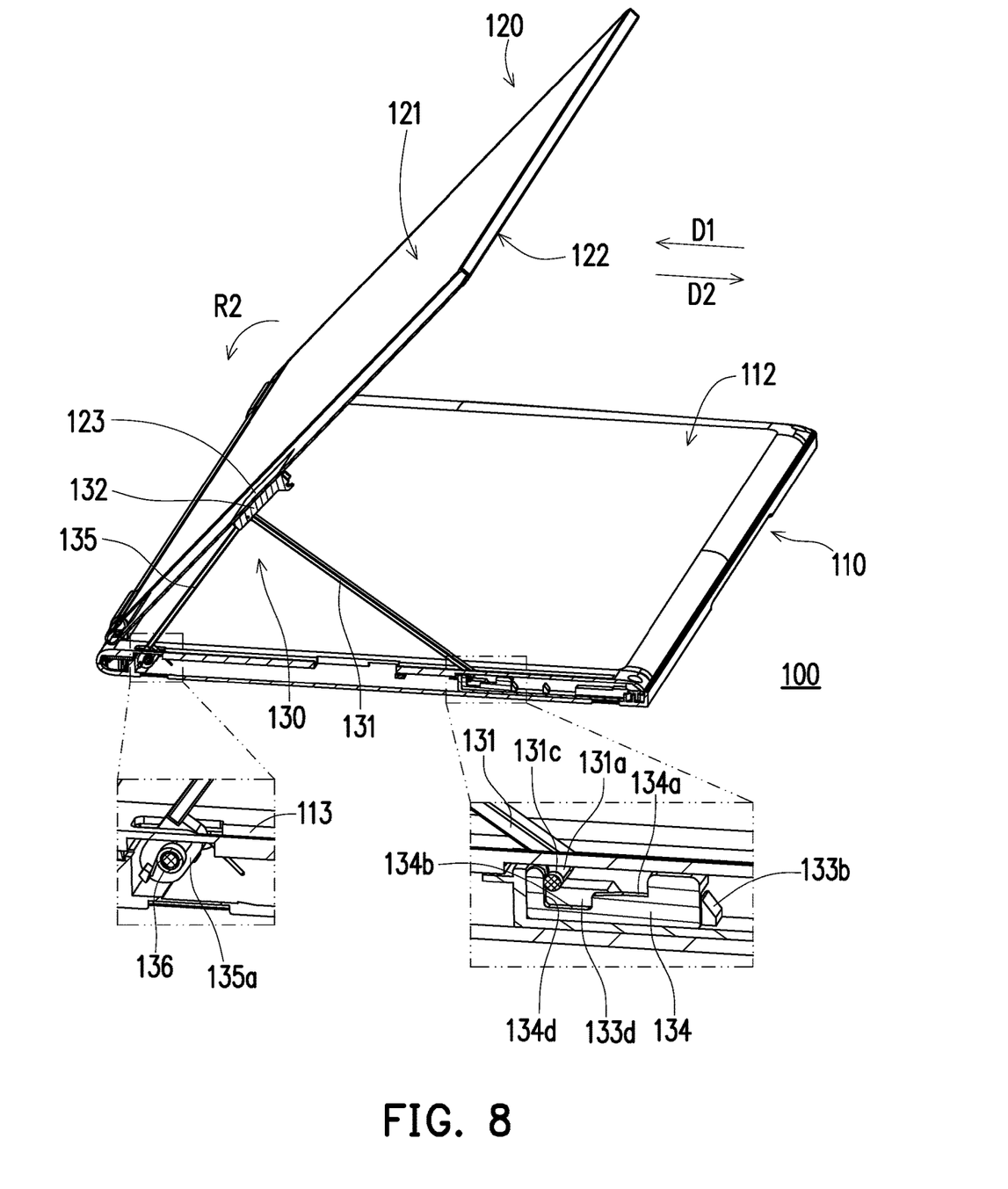
FIGS. 8 and 9 are schematic cross-sectional views of the second body of FIG. 7 continuously being lifted.
Figure 9:
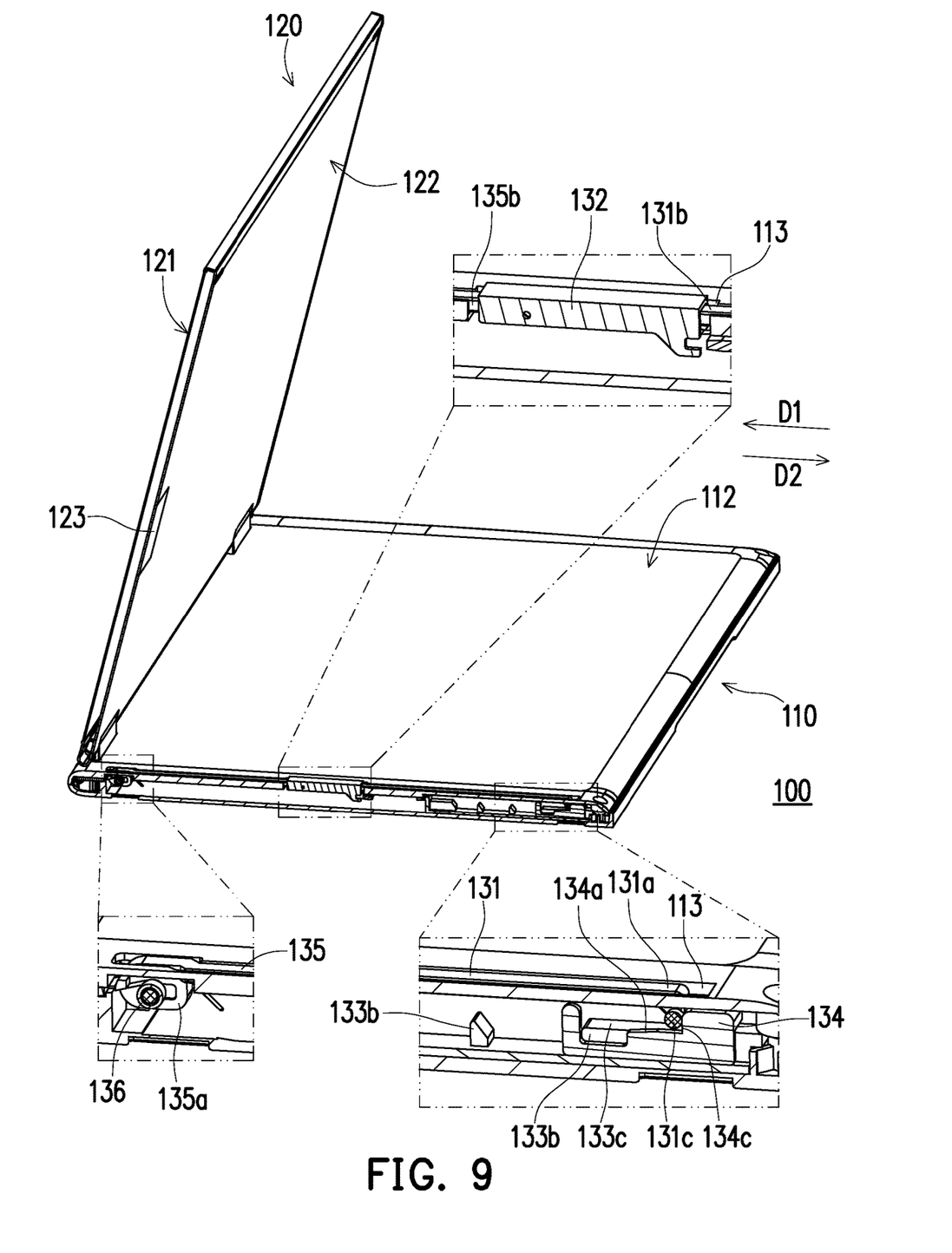

FIGS. 8 and 9 are schematic cross-sectional views of the second body of FIG. 7 continuously being lifted. As shown in FIGS. 7 and 8, the second body 120 continues to be rotated along the second rotating direction R2 and drives the support shaft 131 through the magnetic element 132, so that the first end part 131a of the support shaft 131 continues to slide along the first direction D1. The first end part 131a is detached from the third positioning protrusion 133b and slides toward the second guide boss 133d. At the same time, the projection 131c drives the slider 134 to slide toward the second guide boss 133d. When the first end part 131a of the support shaft 131 contacts the second guide boss 133d, the first end part 131a and the projection 131c of the support shaft 131 are lifted upwards, and the projection 131c is detached from the bottom of the second positioning recess 134b, and the first end part 131a slides on the second guide boss 133d.

As shown in FIGS. 8 and 9, when the first end part 131a of the support shaft 131 slides to the left dead center position, the magnetic element 132 and the support shaft 131 stop being lifted, and the first end part 131a of the support shaft 131 stops sliding along the first direction D1, so that the second body 120 that continues to be rotated along the second rotating direction R2 is detached from the magnetic element 132. Next, the first end part 131a of the support shaft 131 may slide back to the right dead center position along the second direction D2 slide, so that the support shaft 131 and the magnetic element 132 are lowered at the same time and move back into the first body 110 via the opening 113.

In the process of the first end part 131a of the support shaft 131 sliding back to the right dead center position along the second direction D2, the first end part 131a slides on the second guide boss 133d, and the projection 131c slides from the second positioning recess 134b into the first positioning recess 134a. After the projection 131c of the support shaft 131 contacts the first positioning surface 134c, the projection 131c drives the slider 134 to slide along the second direction D2. Since the projection 131c of the support shaft 131 is supported by the bottom of the first positioning recess 134a, the first end part 131a of the support shaft 131 is not blocked or interfered by the positioning protrusions 133b and thus smoothly slides back to the right dead center position along the second direction D2 and moves back onto the first guide boss 133c.

Referring to FIG. 2, in this embodiment, the supporting mechanism 130 further includes an auxiliary rod 135 and a torsion spring 136. The auxiliary rod 135 has a third end part 135a and a fourth end part 135b opposite to the third end part 135a, and the third end part 135a is pivoted to the first body 110. In addition, the fourth end part 135b of the auxiliary rod 135 is pivoted to the magnetic element 132 and the second end part 131b of the support shaft 131, and the fourth end part 135b of the auxiliary rod 135, the magnetic element 132, and the second end part 131b of the support shaft 131 are pivoted coaxially.

Referring to FIGS. 5 to 7, the magnetic element 132 is attracted to to the rear surface 122 of the second body 120, and the magnetic element 132 driven by the second body 120 drives the support shaft 131 and the auxiliary rod 135 to be lifted at the same time. In other words, the magnetic element 132, the support shaft 131, and the auxiliary rod 135 may be lifted at the same time and move out of the first body 110 via the opening 113 to jointly support the second body 120. In addition, two ends of the torsion spring 136 are respectively connected to the third end part 135a of the auxiliary rod 135 and the first body 110. In the process of the auxiliary rod 135 being rotated and lifted, the third end part 135a of the auxiliary rod 135 presses against the torsion spring 136, causing elastic deformation of the torsion spring 136. As shown in FIGS. 7 to 9, when the second body 120 continues to be rotated along the second rotating direction R2 and is detached from the magnetic element 132, the elastic force of the torsion spring 136 acts on the third end part 135a of the auxiliary rod 135, causing the auxiliary rod 135 to be automatically lowered, and at the same time driving the magnetic element 132 and the support shaft 131 to be automatically lowered to move back into the first body 110 via the opening 113, as shown in FIGS. 7 to 9.

As shown in FIGS. 5 to 7, the elastic force of the torsion spring 136 may indirectly act on the support shaft 131, so that the first end part 131a of the support shaft 131 has a tendency to slide along the second direction D2, so that the first end part 131a of the support shaft 131 is stably engaged with any positioning protrusion 133b.

In other embodiments, the supporting mechanism is not disposed with a torsion spring. The user may manually operate the support shaft, the magnetic element, and the auxiliary rod to move the support shaft, the magnetic element, and the auxiliary rod to back into the first body.

Figure 10:
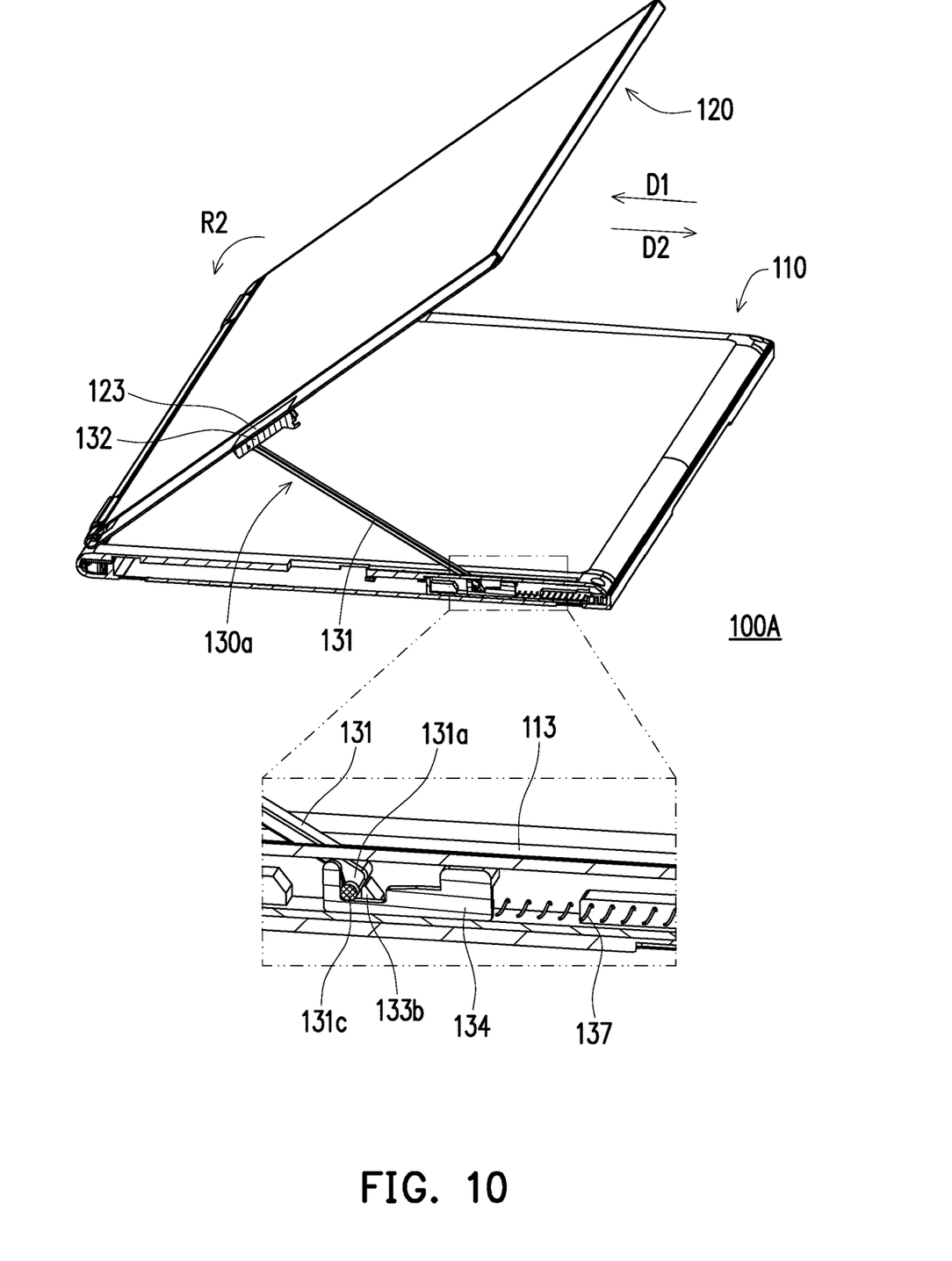
FIG. 10 is a schematic cross-sectional view of a portable electronic device according to another embodiment of the disclosure.

FIG. 10 is a schematic cross-sectional view of a portable electronic device according to another embodiment of the disclosure. Referring to FIG. 10, a portable electronic device 100A of this embodiment is roughly similar to the portable electronic device 100 shown in FIG. 7. The main difference is: in this embodiment, a supporting mechanism 130a is not disposed with an auxiliary rod nor a torsion spring, but is integrated with an expansion spring 137. Specifically, two ends of the expansion spring 137 are respectively connected to the slider 134 and the first body 110. When the second body 120 drives the supporting mechanism 130a to be lifted, the slider 134 slides along the first direction D1 and expands the expansion spring 137, causing deformation of the expansion spring 137. When the second body 120 continues to be rotated along the second rotating direction R2 and is detached from the magnetic element 132, the expansion spring 137 applies elastic force on the slider 134 to drive the drive slider 134 to slide along the second direction D2, so that the slider 134 drives the support shaft 131 to be automatically lowered and move back into the first body 110 via the opening 113.

On the other hand, the elastic force of the expansion spring 137 may indirectly act on the support shaft 131, so that the first end part 131a of the support shaft 131 has a tendency to slide along the second direction D2, so that the first end part 131a of the support shaft 131 is stably engaged with any positioning protrusion 133b.

Figure 11:
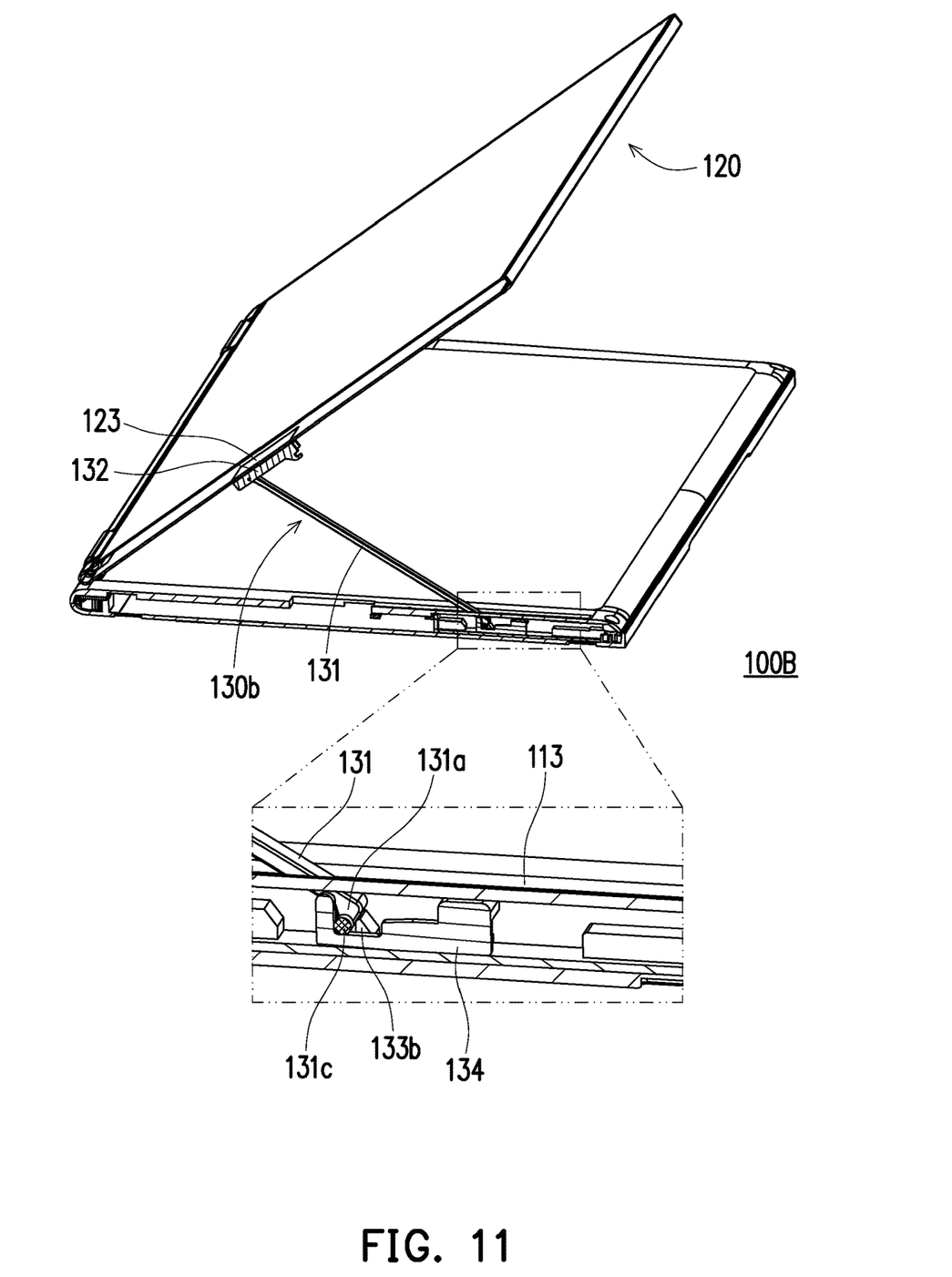
FIG. 11 is a schematic cross-sectional view of a portable electronic device according to another embodiment of the disclosure.

FIG. 11 is a schematic cross-sectional view of a portable electronic device according to another embodiment of the disclosure. Referring to FIG. 11, a portable electronic device 100B of this embodiment is roughly similar to the portable electronic device 100A shown in FIG. 10. The main difference is: in this embodiment, a supporting mechanism 130b is not disposed with an expansion spring, and the user may manually operate the support shaft 131 and the magnetic element 132 to move the support shaft 131 and the magnetic element 132 back into the first body 110.

In summary, in the portable electronic device of the disclosure, the supporting mechanism may be disposed in the first body and be lifted and lowered. The user may rotate the second body along the first rotating direction until a magnetic attraction is generated between the second body and the supporting mechanism and the supporting mechanism is attracted to the second body. Next, the second body is rotated along the second rotating direction opposite to the first rotating direction, so that the supporting mechanism is lifted as the second body moves. Once the second body stops being rotated along the second rotating direction and the supporting mechanism is locked, the supporting mechanism supports the second body to prevent the second body from shaking or tilting when being touched by a finger or a stylus, thereby improving convenience and stability in operation.

Although the disclosure has been disclosed in the above by way of embodiments, the embodiments are not intended to limit the disclosure. Those with ordinary knowledge in the technical field can make changes and modifications without departing from the spirit and scope of the disclosure. Therefore, the scope of protection of the disclosure is defined by the scope of the appended claims.

What is claimed is:

1. A portable electronic device, comprising:
a first body, having a bottom surface and an opening located at the bottom surface;
a second body, pivoted to the first body, having a rear surface and a magnetic part located at the rear surface; and
a supporting mechanism, disposed in the first body corresponding to the opening, wherein the supporting mechanism comprises a support shaft, a magnetic element, and a positioning stand, the support shaft has a first end part and a second end part opposite to the first end part, the positioning stand has a slide rail and a plurality of positioning protrusions, the positioning protrusions are arranged at intervals in the slide rail, the first end part is slidably disposed in the slide rail, and the magnetic element is pivoted to the second end part, wherein
the rear surface of the second body is rotated toward the bottom surface of the first body to allow the magnetic element to be magnetically attracted to the magnetic part, the rear surface of the second body is then rotated away from the bottom surface of the first body, the magnetic element and the support shaft are driven by the second body to move out from the first body via the opening, and when the first end part of the support shaft that slides in the slide rail is engaged with any one of the positioning protrusions, the support shaft supports the second body.

2. The portable electronic device according to claim 1, wherein the first end part of the support shaft is engaged with one of the positioning protrusions, a first included angle exists between the rear surface of the second body and the bottom surface of the first body, the first end part of the support shaft is engaged with another one of the positioning protrusions, and a second included angle different from the first included angle exists between the rear surface of the second body and the bottom surface of the first body.

3. The portable electronic device according to claim 1, wherein the supporting mechanism further comprises a slider, and the slider is slidably disposed in the slide rail of the positioning stand, wherein the support shaft further has a projection connected to the first end part, and the projection is slidably connected to the slider.

4. The portable electronic device according to claim 3, wherein the slider has a first positioning recess and a second positioning recess connected to the first positioning recess, and the projection slides in the first positioning recess and the second positioning recess.

5. The portable electronic device according to claim 4, wherein the projection is located in the first positioning recess, and the first end part is detached from any one of the positioning protrusions.

6. The portable electronic device according to claim 4, wherein the first end part is engaged with any one of the positioning protrusions, and the projection is located in the second positioning recess.

7. The portable electronic device according to claim 4, wherein the slider further has a first positioning surface and a second positioning surface opposite to the first positioning surface, the first positioning recess and the second positioning recess are located between the first positioning surface and the second positioning surface, under a status, the projection is located in the first positioning recess and contacts the first positioning surface, and under another status, the projection is located in the second positioning recess and contacts the second positioning surface.

8. The portable electronic device according to claim 4, wherein the positioning stand further has a first guide boss and a second guide boss located in the slide rail, the positioning protrusions are arranged at intervals between the first guide boss and the second guide boss, one of the positioning protrusions is connected to the first guide boss, under a status, the projection is located in the first positioning recess, and the first end part is located on the first guide boss, and under another status, the projection is located in the second positioning recess, and the first end part is located on the second guide boss.

9. The portable electronic device according to claim 3, wherein the supporting mechanism further comprises an expansion spring, and the expansion spring connects the slider and the first body.

10. The portable electronic device according to claim 1, wherein the supporting mechanism further comprises an auxiliary rod, the auxiliary rod has a third end part and a fourth end part opposite to the third end part, the third end part is pivoted to the first body, and the fourth end part is pivoted to the magnetic element and the second end part.

11. The portable electronic device according to claim 10, wherein the support shaft, the magnetic element, and the auxiliary rod are lifted and lowered at the same time, and move out of the first body or move back into the first body via the opening.

12. The portable electronic device according to claim 10, wherein the supporting mechanism further comprises a torsion spring connecting the first body and the third end part, and as the auxiliary rod is lifted, the torsion spring is pressed against by the third end part and experiences elastic deformation.

13. The portable electronic device according to claim 1, further comprising a switch knob slidably disposed on the first body, wherein the switch knob is disposed corresponding to the magnetic element and is engaged with or detached from the magnetic element.

\* \* \* \* \*